(12) United States Patent
Basson et al.

(10) Patent No.: US 7,913,155 B2
(45) Date of Patent: Mar. 22, 2011

(54) SYNCHRONIZING METHOD AND SYSTEM

(75) Inventors: Sara H. Basson, White Plains, NY (US); Sarah Louise Conrod, Sydney (CA); Alexander Faisman, Croton-on-Hudson, NY (US); Wilfredo Ferre, Le Mesnil le Roi (FR); Julien Ghez, Malakoff (FR); Dimitri Kanevsky, Ossining, NY (US); Ronald Francis MacNeil, Sydney (CA)

(73) Assignees: International Business Machines Corporation, Armonk, NY (US); Cape Brown University, Sydney (CA)

( * ) Notice: Subject to any disclaimer, the term of this patent is extended or adjusted under 35 U.S.C. 154(b) by 1175 days.

(21) Appl. No.: 11/355,124

(22) Filed: Feb. 15, 2006

(65) Prior Publication Data

US 2007/0188657 A1   Aug. 16, 2007

(51) Int. Cl.
*G06F 17/00* (2006.01)
(52) U.S. Cl. .......................... 715/203; 715/200
(58) Field of Classification Search .................. 715/200, 715/203
See application file for complete search history.

(56) References Cited

U.S. PATENT DOCUMENTS

| | | | |
|---|---|---|---|
| 5,648,789 A | 7/1997 | Beadles et al. | |
| 5,793,903 A | 8/1998 | Lopresti et al. | |
| 5,852,684 A | 12/1998 | Lopresti et al. | |
| 5,929,848 A | 7/1999 | Albukerk et al. | |
| 5,931,908 A | 8/1999 | Gerba et al. | |
| 6,005,536 A | 12/1999 | Beadles et al. | |
| 6,473,792 B1 | 10/2002 | Yavitz et al. | |
| 6,476,871 B1 | 11/2002 | Fu | |
| 6,493,872 B1 * | 12/2002 | Rangan et al. | 725/32 |
| 6,526,351 B2 | 2/2003 | Whitham | |
| 6,704,699 B2 | 3/2004 | Nir | |
| 6,760,408 B2 | 7/2004 | Crosson et al. | |
| 6,785,539 B2 | 8/2004 | Hale et al. | |
| 6,820,055 B2 * | 11/2004 | Saindon et al. | 704/235 |
| 6,937,766 B1 * | 8/2005 | Wilf et al. | 382/229 |
| 2001/0025241 A1 * | 9/2001 | Lange et al. | 704/235 |
| 2002/0055950 A1 * | 5/2002 | Witteman | 707/500.1 |
| 2002/0120925 A1 * | 8/2002 | Logan | 725/9 |
| 2003/0104824 A1 | 6/2003 | Hale et al. | |
| 2003/0198921 A1 | 10/2003 | Ueda | |
| 2004/0044532 A1 * | 3/2004 | Karstens | 704/271 |
| 2004/0138872 A1 | 7/2004 | Nir | |
| 2005/0058435 A1 | 3/2005 | Chung et al. | |
| 2005/0078947 A1 | 4/2005 | Chung et al. | |
| 2005/0105890 A1 | 5/2005 | Chung et al. | |
| 2005/0128350 A1 | 6/2005 | Kim | |
| 2005/0149336 A1 * | 7/2005 | Cooley | 704/277 |
| 2005/0211768 A1 * | 9/2005 | Stillman | 235/381 |

OTHER PUBLICATIONS

N. Kane Bennett, "Low Digital Prices Facilitate Video Depositions", Dec. 5, 2005, The Connecticut Law Tribune, pp. 1-3.*

* cited by examiner

*Primary Examiner* — Laurie Ries
*Assistant Examiner* — Chau Nguyen
(74) *Attorney, Agent, or Firm* — Schmeiser, Olsen & Watts; William E. Schiesser

(57) ABSTRACT

A synchronization system and method. Text data is received by a computing device. The text data is associated with audio/video data. The audio/video data is generated during a related performance. The audio/video data and the text data are discrete data. The text data is synchronized to correspond with the audio/video data during the performance. The synchronized text data is displayed by the computing device during the performance.

39 Claims, 6 Drawing Sheets

SYNCHRONIZING METHOD AND SYSTEM

TECHNICAL FIELD

The present invention relates to a method and associated system for synchronizing text with an associated audio/video performance.

BACKGROUND OF THE INVENTION

Providing text captions related to an audio signal typically requires an expensive system incapable of modifying the text captions. Accordingly, there exists a need in the art to overcome the deficiencies and limitations described herein above.

SUMMARY OF THE INVENTION

The present invention provides a method, comprising:
receiving, by a computing device, text data, said text data associated with audio/video data, wherein said audio/video data is generated during a related performance, and wherein said audio/video data and said text data are discrete data;
synchronizing, said text data to correspond with said audio/video data during said performance; and
displaying, by said computing device, said synchronized text data during said performance, wherein said audio/video data generated during said performance is not displayed by said computing device.

The present invention provides a computing system comprising a processor coupled to a computer-readable memory unit, said memory unit comprising instructions that when executed by the processor implement an association method, said method comprising;
receiving, text data, said text data associated with audio/video data, wherein said audio/video data is generated during a related performance, and wherein said audio/video data and said text data are discrete data;
synchronizing, said text data to correspond with said audio/video data during said performance; and
displaying, said synchronized text data during said performance wherein said audio/video data generated during said performance is not displayed by said computing device.

The present invention provides a computer program product, comprising a computer usable medium comprising a computer readable program code embodied therein, said computer readable program code comprising an algorithm adapted to implement an synchronization method within a computing system, said method comprising:
receiving, text data, said text data associated with audio/video data, wherein said audio/video data is generated during a related performance, and wherein said audio/video data and said text data are discrete data;
synchronizing, said text data to correspond with said audio/video data during said performance; and
displaying, said synchronized text data during said performance, wherein said audio/video data generated during said performance is not displayed by said computing device.

The present invention provides a process for integrating computing infrastructure, comprising integrating computer-readable code into a computer system, wherein the code in combination with the computer system is capable of performing a method comprising:
receiving, text data, said text data associated with audio/video data, wherein said audio/video data is generated during a related performance, and wherein said audio/video data and said text data are discrete data;
synchronizing, said text data to correspond with said audio/video data during said performance; and
displaying, said synchronized text data during said performance, wherein said audio/video data generated during said performance is not displayed by said computing device.

The present invention advantageously provides a system and associated method capable of modifying text captions related to an audio signal.

BEST MODE FOR CARRYING OUT THE INVENTION

Figure 1:
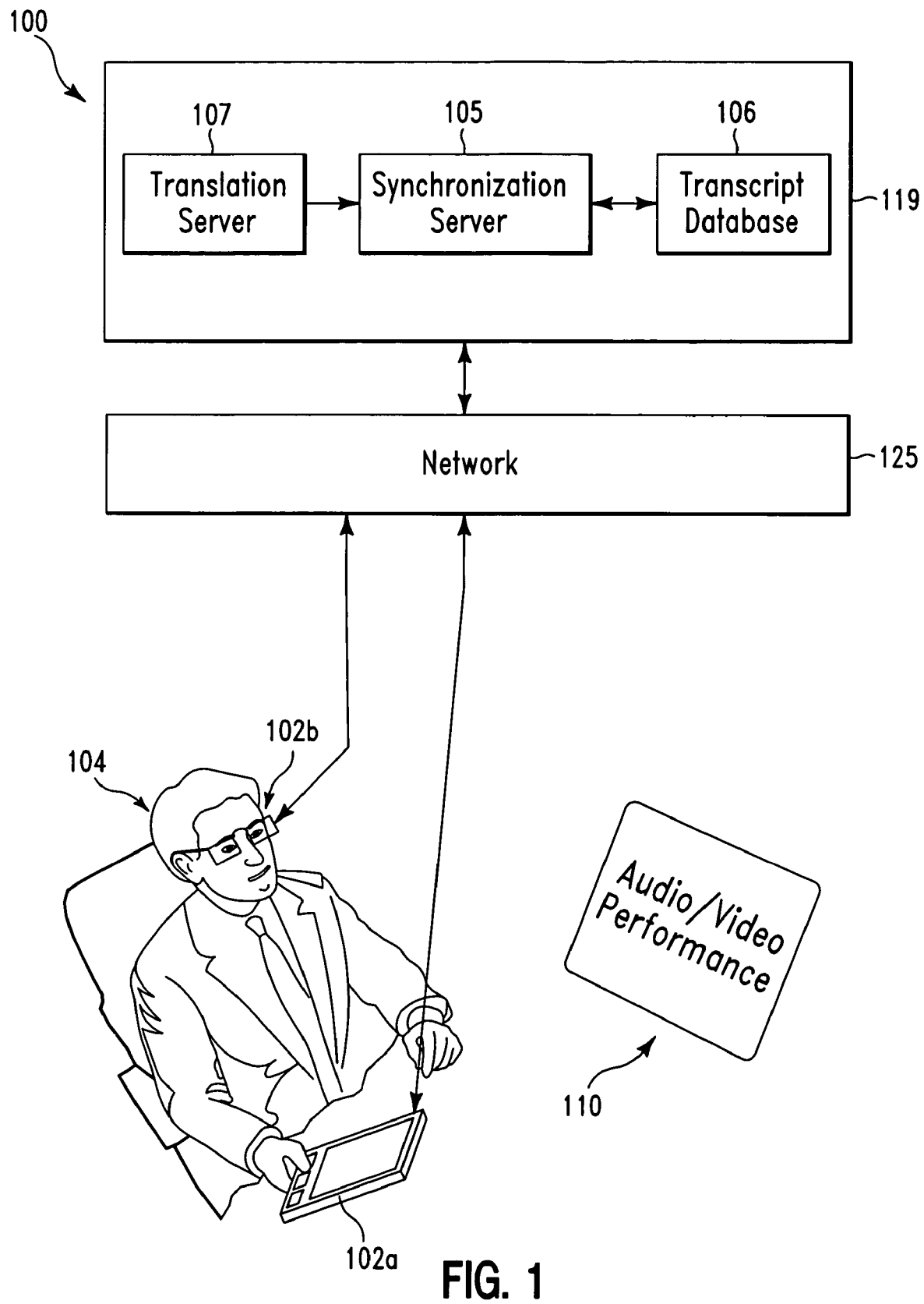
FIG. 1 illustrates a block diagram view of a system for synchronizing and displaying text associated with an audio/video performance, in accordance with embodiments of the present invention.

FIG. 1 illustrates a block diagram view of a system 100 for synchronizing and displaying text associated with an audio/video performance 110, in accordance with embodiments of the present invention. System 100 allows users (e.g., user 104) to view captioned text and/or translated text (i.e., translated to a different language) related to and synchronized with an audio/video performance 110. The captioned text and/or translated text is viewed through discrete devices (e.g., devices 102a and 102b, etc). Discrete devices are defined herein as separate or distinct devices. Audio/video performance 110 may comprise any type of audio/video performance including, inter alia, a movie, a television show, a radio show, a live theater event, a training seminar, a museum tour, etc.

System 100 comprises a transcription system 119, devices 102a and 102b, network 125, and audio/video performance 110. Transcription system 119 comprises a hardware/software system. Transcription system 119 comprises translation server 107, synchronization server 105, and transcript database 106. Transcription system 119 may comprise an individual computing apparatus comprising translation server 107, synchronization server 105, and transcript database 106. Alternatively, transcription system 119 may comprise a computing system comprising individual components (i.e., translation server 107, synchronization server 105, and transcript database 106) in separate geographical locations. Transcription system 119 is connected to devices 102a and 102b through network 125. Network 125 may comprise any type of network known to a person of ordinary skill in the art including, inter alia, a wireless network, a local area network, a wide area network, the Internet, etc. Translation server and/or synchronization server may alternatively be located within devices 102a and/or 102b. Transcript database 106 comprises transcripts (i.e., text data) related to audio/video performances (i.e., the text data is related to audio/video data generated during audio/video performances). The text data and the audio/video data each comprise discrete data. Discrete data is defined herein as separate or distinct sets of data. Therefore, the text data and the audio/video data each comprise separate and distinct sets of data. Synchronization server 105 is used to synchronize the transcripts (i.e., text data) from transcript database 106 with audio/video performances (e.g., audio/video performance 110). Translation server 107 translates the text data from transcript database 106 from a first language to a second language (i.e., if requested). Each of devices 102a and 102b may comprise any type of portable device capable of displaying text data including, inter alia, a personal digital assistant (PDA), a laptop computer, a cellular telephone, a head mounted display, etc. Audio/video performance 110 may comprise a pre-recorded audio/video performance or a live audio/video performance. A prerecorded audio/video performance may comprise, inter alia, a television show, a movie, a radio show, etc. A live audio/video performance may comprise, inter alia, a live theater event, a training seminar, an academic course (e.g., for high school, college, etc), a museum tour, etc. A user 104 may view a text transcription corresponding to audio/video performance 110 via devices 102a and/or 102b. In FIG. 1, device 102a comprises a PDA and device 102b comprises video glasses (i.e., glasses comprising a display for reading text). Text data (i.e., transcript) related to audio/video performance 110 is synchronized (i.e., by synchronization server 105) with audio/video performance 110 such that portions of text from the text data corresponding to related portions of audio/video performance 110 are displayed simultaneously during a performance of the related portions of audio/video performance 110. An entire transcript (i.e., related to audio/video performance 110) may be downloaded to device 102a and/or 102b prior to a start time for audio/video performance 110 and portions of the transcript may be synchronized with audio/video performance 110 during audio/video performance 110. Alternatively, portions of the transcript (i.e., related to audio/video performance 110) may be downloaded to devices 102a and/or 102b in real-time during audio/video performance 110 and the portions of the transcript may be synchronized with audio/video performance 110 during audio/video performance 110. The following examples illustrate various methods for synchronizing the text data with audio/video performance 110.

Example 1

A transcript (i.e., associated with audio/video performance 110) in the transcript database 106 comprises timing information (e.g., time stamp data). The timing information relates portions of the transcript to portions of audio/video performance 110. The timing information marks portions of the transcript with specific time units. For example, a first word of the transcript may be marked as "time 0" and each consecutive word and/or sentence may be marked in specific units of time as related to "time 0 (e.g., time 1, time 2, time 3, time 4, etc). Each time stamped portion of the transcript is associated with a related portion of audio/video performance 110. Users (e.g., user 104) attending audio/video performance 110 have wireless internet access to transcription system 119 via devices 102a and/or 102b. To begin the synchronization process, devices 102a and/or 102b automatically retrieve (e.g., through a microphone) a first portion of audio from audio/video performance 110 and transmit the retrieved first portion of audio to translation server 107. Translation server 107 performs an automatic speech recognition process on the retrieved portion of audio to generate a first portion of text associated with the retrieved first portion of audio. The first portion of text (i.e., generated by the translation server 107) is matched with a portion of the transcript (i.e., comprising a same or similar portion of text) associated with audio/video performance 110. The matched portion of the transcript is synchronized with a related portion of the audio/video performance 110 (i.e., comprising the retrieved first portion of audio) and displayed for user 104 simultaneously during the related portion of the audio/video performance 110. Additional consecutive portions of the transcript are displayed for user 104 simultaneously during related portions of audio/video performance 110 according to the timing information. The automatic speech recognition process generating the first portion of text (i.e., generated by the translation server 107) is only necessary to synchronize a portion of the transcript with a related portion of audio/video performance 110. The timing information is used to display each additional consecutive portion of the transcript simultaneously with related portions of audio/video performance 110 such that the synchronized transcript is displayed on device 104a and/or 104b in synchrony with audio/video performance 110. Additionally, the audio/video performance 110 may comprise a first language (e.g., English) and the synchronized transcript may be displayed on device 104a and/or 104b in a second language (e.g., French). For example, the transcript database 106 may comprise an English version and a French version of the transcript associated with audio/video performance 110. The French transcript comprises timing information matching the English transcript. As described, supra, devices 102a and/or 102b automatically retrieve (e.g., through a microphone) a first portion of audio (i.e., in English) from audio/video performance 110 and transmit the retrieved first portion of audio to translation server 107 that will perform an automatic speech recognition of the (English) audio to generate a first portion of text associated with the retrieved first portion of audio. The first portion of text (i.e., generated by translation server 107) is matched with a portion of the English transcript (i.e., comprising a same or similar portion of text) associated with audio/video performance 110. The first portion of text (i.e., generated by translation server 107) will be used by translation server 107 to align the English transcript with the French transcript. As described, supra, portions of the French transcript will be displayed simultaneously during related portions of audio/video performance 110.

Example 2

A transcript (i.e., associated with audio/video performance 110) in the transcript database 106 comprises timing information (e.g., time stamp data). The timing information relates portions of the transcript to portions of audio/video performance 110 as described with reference to example 1, supra. The timing information enables the text data to be synchronized with audio/video performance 110. For example, when audio/video performance 110 is initiated, a count may be enabled (e.g., using device 102a) for counting an amount of time from a beginning of audio/video performance 110. The count is compared to the timing information (i.e., each specific unit) comprised by the text data and when a match is found (i.e., a match between a time unit from the count and a time unit from the timing information), a related section of text (i.e., comprising the matching time unit) is displayed for the user (e.g., user 104). Once the text data and audio/video performance 110 are synchronized, user 104 may view the synchronized text data and audio/video performance 110 simultaneously. If audio/video performance 110 is interrupted (e.g., power failure, equipment failure, etc), a speech recognition process of an audio portion of the audio video performance (as described, supra) may be used to synchronize the text data with audio/video performance 110 again. Alternatively, a speech recognition process of an audio portion of audio/video performance 110 (as described, supra) may be used to generate text (i.e., instead of using pre-stored text data from transcript database 106) and the generated text may be synchronized with audio/video performance 110 and displayed for a user (e.g., user 104). The aforementioned process may be enables user 104 to view sections of text related to corresponding sections of audio/video performance 110.

Example 3

A transcript (i.e., associated with audio/video performance 110) in the transcript database 106 comprises timing information (e.g., time stamp data). The timing information relates portions of the transcript to portions of audio/video performance 110 as described with reference to example 1, supra. Synchronization server 105 comprises a plurality of pre-stored video images (e.g., stored in synchronization server 105) from audio/video performance 110 (e.g., screen shots). Each of the pre-stored video images is associated with a related portion of the transcript. Users (e.g., user 104) attending audio/video performance 110 have wireless internet access to transcription system 119 via devices 102a and/or 102b. To begin the synchronization process, devices 102a and/or 102b automatically retrieve (e.g., through a camera) at least a first portion of video (e.g., a first image of video) from audio/video performance 110 and transmit the retrieved at least first portion of video to translation server 107. Translation server 107 automatically matches the first portion of video with one of the pre-stored video images in synchronization server 105. Alternatively, user 104 may manually (i.e., by visually comparing) match the first portion of video with one of the pre-stored video images in synchronization server 105. The stored video image matching the first portion of video is associated with a specific portion of the transcript so therefore the specific portion of the transcript is displayed for the user 104 as described, supra. Additional consecutive portions of the transcript are displayed for user 104 simultaneously with related portions of audio/video performance 110 according to the timing information.

Figure 2:
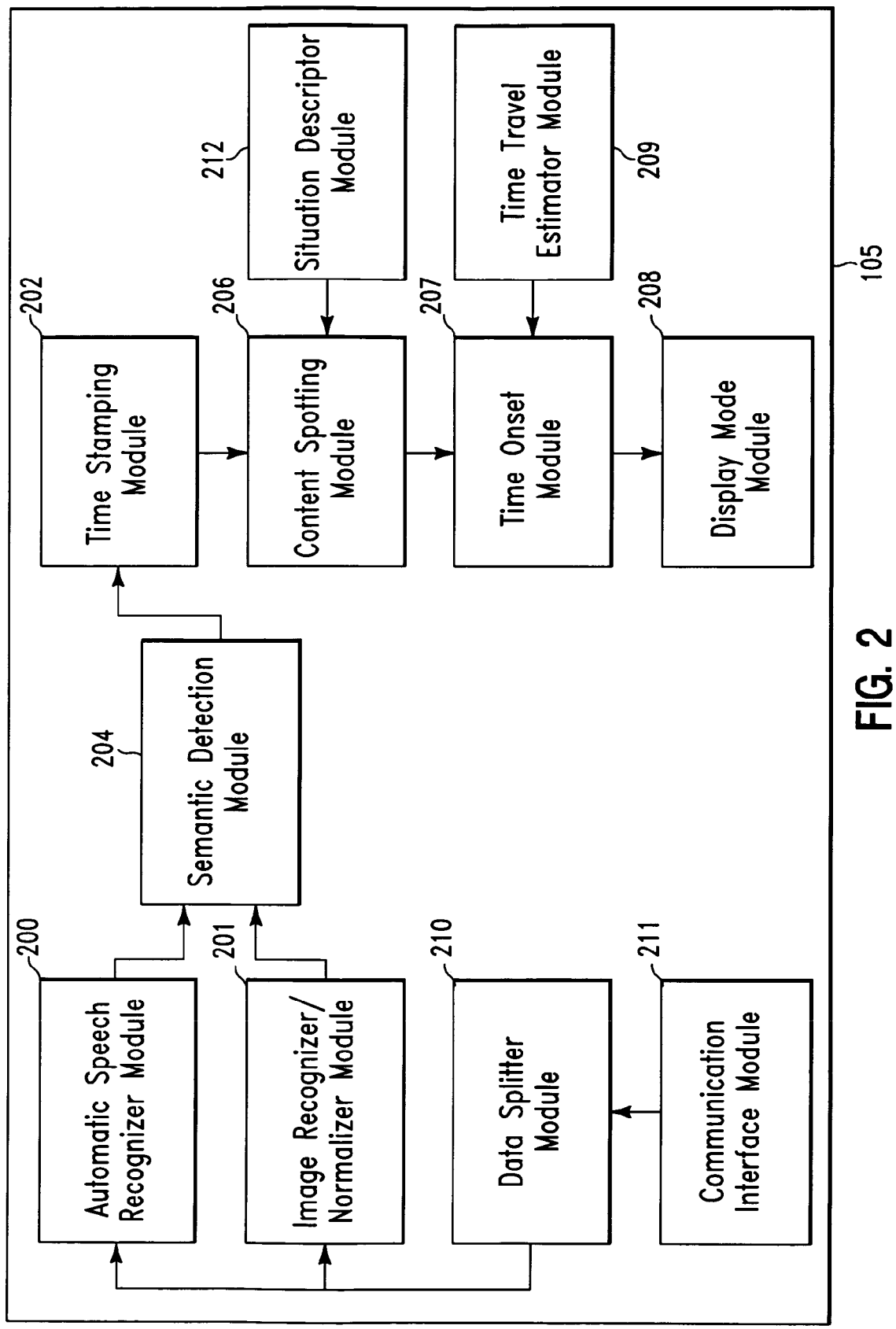
FIG. 2 illustrates an internal block diagram view of the synchronization server of FIG. 1, in accordance with embodiments of the present invention.

FIG. 2 illustrates an internal block diagram view of synchronization server 105 of FIG. 1, in accordance with embodiments of the present invention. Synchronization server 105 comprises a plurality of processing modules 200, 201, 202, 204, 206, 207, 208, 209, 210, 211, and 212. Each of processing modules 200, 201, 202, 204, 206, 207, 208, 209, 210, 211, and 212 may comprise hardware modules, software modules, or any combination thereof. Communication interface module 211 interfaces synchronization server 105 to devices 102a and 102b. Communication interface module 211 may comprise, inter alia, a wireless communication interface, an internet communication interface, etc. Any data that is received from devices 102a and 102b (e.g., audio and/or video from audio/video performance 110 of FIG. 1 as described with respect to examples 1-3) is inputted through communication interface module 211 to data splitter module 210. Data splitter module 210 routes data by data type (e.g., audio, video, etc). Data splitter module 210 routes audio to automatic speech recognizer module (ASR) 200 to perform an automatic speech recognition process on a retrieved portion of audio from audio performance 110 through device 102a and/or 102b as described, supra, with respect to example 1. Alternatively, automatic speech recognizer module (ASR) 200 performs an automatic speech recognition process on a retrieved portion of audio from a user(s) of device 102a and/or 102b for performing an optional semantic detection synchronization process as described, infra. Data splitter module 210 routes video to image recognizer/normalizer module 201 for processing as described, supra, with respect to example 3. Image recognizer/normalizer module 201 recognizes images within the retrieved video (e.g., images of people, buildings, animals, background, automobiles, etc), labels the images, and describes actions related to the images (e.g., moving, flying, talking, eating, etc). Additionally, image recognizer/normalizer module 201 transforms a view of each image into a canonical view. A canonical view is defined herein as a standard view of the image. In this case, a canonical view of the image comprises a front view of the image as would be viewed from a position directly in front of (i.e., a position perpendicular to) audio/video performance 110. The image(s) captured from device 102a and/or 102b may be captured from audio/video performance 110 at different angles with respect to audio/video performance 110 so therefore the recognizer/normalizer module 201 will transform a view of the image(s) into a canonical form (i.e., for processing) as if they were viewed from directly in front of audio/video performance 110. Optionally, user 104 may verbally describe (e.g., speaking into device 102a and/or 102b) a portion of audio video performance 110. The verbal description is converted into text by ASR 200. The text is transmitted to semantic detection module 204. Semantic detection module 204 compares the text to images from image recognizer/normalizer module 201 to determine a match thereby enabling a synchronization process between a transcript and audio/video performance 110. For example, user 104 viewing audio/video performance 110 describes a portion of video from audio/video performance 110 (e.g., actor X starting to drive a car). The description is retrieved by device 102a or 102b, converted into text by ASR 200, and compared to stored video images in image recognizer/normalizer module 201 to determine a matching image (e.g., an image of actor X starting to drive a car). Time stamping module 202 generates timing information (e.g., time stamp data) for audio (i.e., transformed into text by ASR 200 herein referred to as processed data) and/or the video (i.e., transformed into labeled images by image recognizer/normalizer module 201 herein referred to as processed data). The timing information associates a performance time (i.e., from audio/video performance 110) with the processed data. Content spotting module 206 matches the processed data to related portions of an associated transcript from transcript database 106 of FIG. 1. The processed data and related portions of the associated transcript may be matched as two sequences of symbols. The two sequences of symbols may comprise words or image labels. Additionally (in the retrieved video embodiment), content spotting module 206 may compare a transformed sequence of images to a reference set of images (i.e., a stored set of images). For example, a set of frames from a movie (e.g., audio/video performance 110) captured by a camera within device 102a and/or 102b may be compared to a set of pre-stored video frames (e.g., stored in synchronization server 105) from audio/video performance 110 to identify frames from the movie (e.g., audio/video performance 110) that comprise a best match with the set of frames. If a match between a set of frames and a set of pre-stored video frames is found, the time stamping module 202 may time stamp a transcript from transcript database 106 with an induced time stamp. Situation descriptor module 208 generates additional information for content spotting module 206 to allow an accurate match between the processed data and related portions of an associated transcript from transcript database 106. For example, if a scheduled movie starts late or advertisements at the onset of the movie generate noise data, it may be difficult to generate an accurate match between the processed data and related portions of an associated transcript from transcript database 106. Situation descriptor module 208 eliminates the noise data. Time onset module 207 identifies the latest processed data that matches a related portion of the associated transcript and sets a time offset corresponding the matched elements (i.e., a time that corresponds time stamping of the related transcript and any time delay that may occur). If a time delay occurs between the time stamp and a time that a portion of the transcript reaches a user (e.g., a travel time occurring between synchronization server 105 and user 104) the time delay may be estimated by time travel estimator 209 and the time offset may be modified accordingly. Display mode module 208 sends the related portion of the transcript to device 102a and/or 102b.

Figure 3:
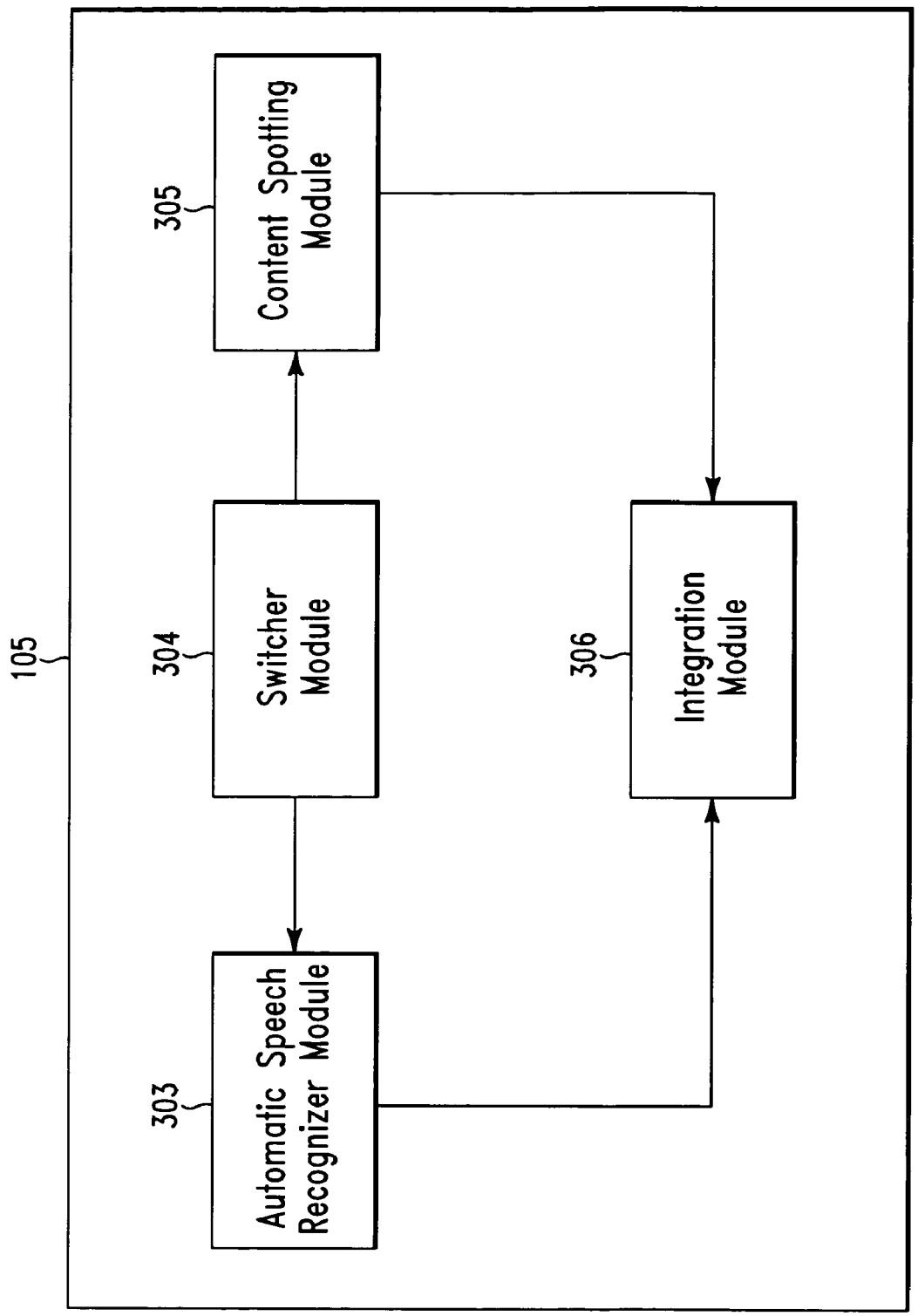
FIG. 3 illustrates an alternative to the synchronization server of FIG. 2, in accordance with embodiments of the present invention.

FIG. 3 illustrates an alternative internal block diagram view of synchronization server 105 of FIG. 2, in accordance with embodiments of the present invention. Synchronization server 105 enables a user to attend a live performance in which some portions audio from the live performance comprise significant differences from a stored transcript associated with the live performance. A portion of audio from the live performance is retrieved via device 102a and/or 102b as described with reference to FIG. 1. The portion of audio is transmitted to a switcher server 304 to determine whether the portion of audio matches a portion of the stored transcript. If a portion of audio does not match a portion of the stored transcript, the portion of audio is sent to an automatic speech recognizer module (ASR) 303 to perform an automatic speech recognition process and generate a portion of text. If a portion of audio does match a portion of the stored transcript, the matching portion of audio is sent to a content spotting module 305 to retrieve a related portion of text from transcript database 106. The aforementioned process is repeated throughout the live performance and data from ASR 303 and data content spotting module 305 is integrated by an integration module 306 into a single text transcript. The aforementioned process allows a user to view text (i.e., from the live performance) that comprises some text generated from ASR 303 and some text from a pre-stored transcript.

Figure 4:
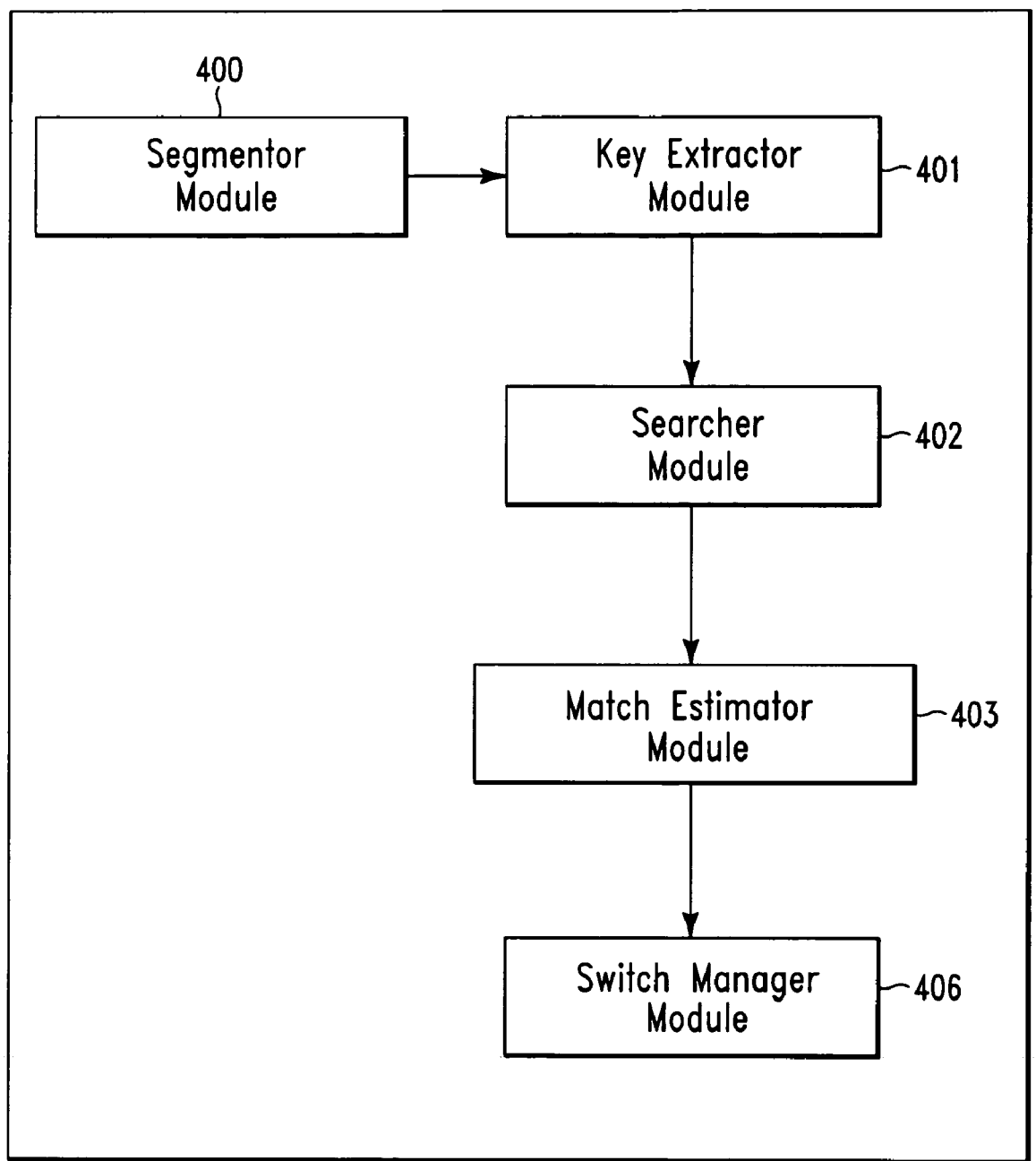
FIG. 4 illustrates an internal block diagram view of switcher of FIG. 3, in accordance with embodiments of the present invention.

FIG. 4 illustrates an internal block diagram view of switcher 304 of FIG. 3, in accordance with embodiments of the present invention. Segmentor module 400 comprises a segmenting device that divides retrieved audio and/or video into short segments. Segmentor module 400 uses heuristics tools to avoid splitting segments comprising connected phrases or object images. As a first example, segmentor module 400 may use a language model to avoid segmenting a word that comprises multiple words (e.g., everybody, throughout, wherein, cannot, etc). As a second example, segmentor module 400 may use object recognition to avoid segmenting images of single object (e.g., a car, a person, etc). Key extractor 401 extracts a key element from a segment in 400 (e.g. a topically relevant word or phrase for text processing or an image of a significant object such as, inter alia, a gun for a movie about a crime). Searcher module 402 searches and compares extracted key elements to the pre-store transcript. Match estimator module 403 evaluates the comparison and locates matches. Match estimator module 403 may use various metrics to perform the evaluation such as, inter alia, metrics that compare pairs of strings. Depending on the evaluation from match estimator module 403, switch manager module 404 selects either ASR module 303 to generate text or content spotting module 305 to retrieve text from the associated transcript.

Figure 5:
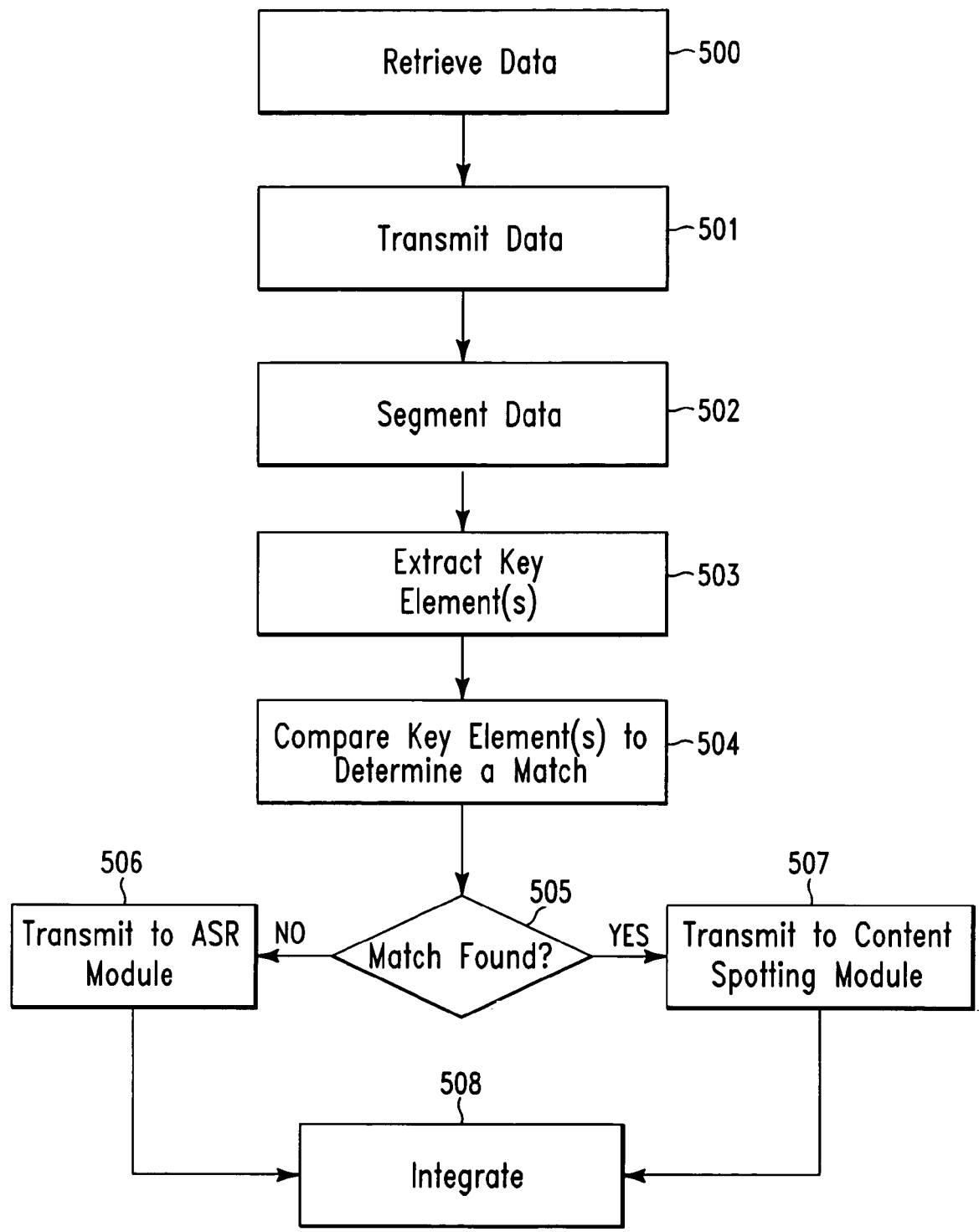
FIG. 5 illustrates an algorithm describing a process for synchronizing and displaying text associated with an audio/video performance of FIGS. 1-4, in accordance with embodiments of the present invention.

FIG. 5 illustrates an algorithm describing a process used by system 100 of FIGS. 1-4 for synchronizing and displaying text associated with audio/video performance 110, in accordance with embodiments of the present invention. In step 500, data (e.g., audio, video, etc) from audio/video performance 110 is retrieved via device 102a and/or 102b. Alternatively, user 104 may provide the data (i.e., audio retrieved via device 102a and/or 102b) by describing a portion of audio/video performance. In step 501, the data is transmitted to synchronization server 105. In step 502, the data is segmented as described with reference to FIG. 4. In step 503, a key element (s) is extracted from the segmented data. In step 504, the extracted key elements are compared to portions a related stored transcript. In step 505, it is determined if any of the extracted key elements match any portions of the stored transcript. If in step 505, it is determined that an extracted key element matches a portion of the stored transcript then in step 507, the extracted key element is transmitted to content spotting module 305 in step 507 to retrieve the portion of text from the associated transcript. If in step 505, it is determined that an extracted key element does not match a portion of the stored transcript then in step 506, the extracted key element is transmitted ASR module 303 to generate text associated with the extracted key element. Text generated in step 506 and portions of text retrieved in step 507 are integrated in step 508 into a single text transcript. The aforementioned process allows a user to view text that comprises some text generated from ASR 303 and some text retrieved from a pre-stored transcript.

Figure 6:
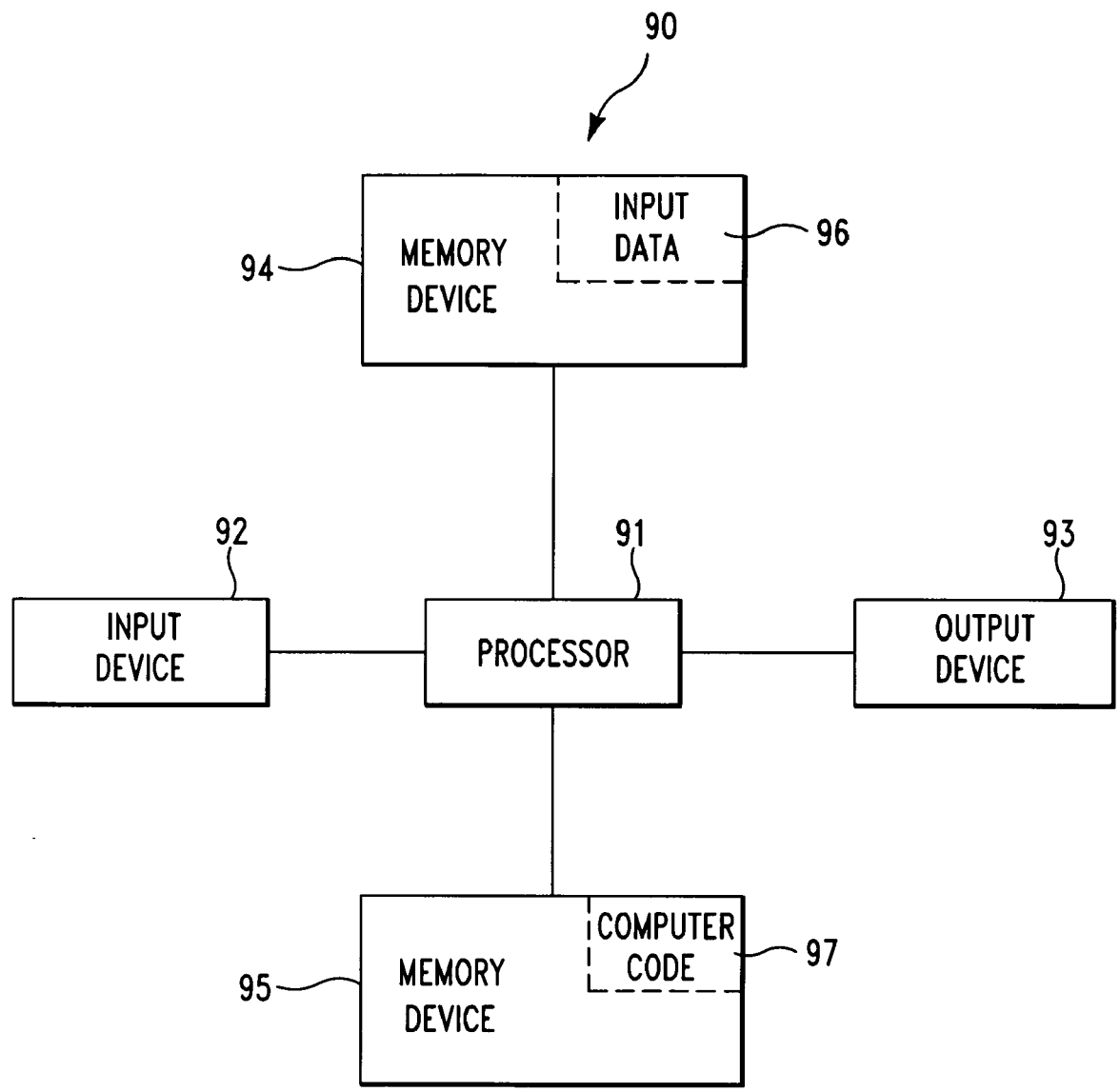
FIG. 6 illustrates a computer system used for synchronizing and displaying text associated with an audio/video performance, in accordance with embodiments of the present invention.

FIG. 6 illustrates a computer system 90 used for synchronizing and displaying text associated with an audio/video performance 110, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for synchronizing and displaying text associated with an audio/video performance 110. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to synchronize and display text associated with an audio/video performance. Thus the present invention discloses a process for deploying or integrating computing infrastructure, comprising integrating computer-readable code into the computer system 90, wherein the code in combination with the computer system 90 is capable of performing a method for synchronizing and displaying text associated with an audio/video performance. In another embodiment, the invention provides a business method that performs the process steps of the invention on a subscription, advertising, and/or fee basis. That is, a service provider, such as a Solution Integrator, could offer to synchronize and display text associated with an audio/video performance. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   receiving, by a computing device, text data, said text data associated with audio/video data, wherein said audio/video data is generated during a related performance, wherein said related performance is a live performance attended by a user of said computing device, and wherein said audio/video data and said text data are discrete data;
   receiving, by a translation server of said computing device, a portion of video from said audio/video data during said performance;
   comparing, by said translation server of said computing device, said portion of video to a plurality of pre-stored reference video images on a synchronization server of said computing device;
   determining, by said translation server of said computing device based on results of said comparing, a match between a first reference video image of said plurality of pre-stored reference video images and a first image of said portion of video;
   synchronizing, said text data to correspond with said audio/video data during said performance, wherein said synchronizing comprises associating said first reference video image to a corresponding portion of said text data and aligning said corresponding portion of said text data with said first image; and
   displaying for said user, by a first discrete device and a second discrete device of said computing device, said synchronized text data during said performance, wherein said first discrete device consists of video glasses, wherein said second discrete device consists of a personal digital assistant, and wherein said audio/video data generated during said performance is not displayed by said computing device.

2. The method of claim 1, wherein said text data comprises time stamp data that identifies portions of said text data corresponding to potions of said performance, and wherein said method further comprises:
   counting time units beginning with a starting time of said performance, wherein said synchronizing further comprises comparing each of said time units to said time stamp data to determine a match.

3. The method of claim 1, further comprising:
   receiving, by the translation server of said computing device, a first portion of audio from said audio/video data during said performance; and
   generating a first portion of text from said first portion of said audio/video data, wherein said synchronizing further comprises matching said first portion of text to a corresponding portion of said text data and aligning said corresponding portion of text data with said first portion of said audio/video data.

4. The method of claim 1, wherein said text data is in a first language, wherein said audio/video data comprises a second language, and wherein said first language and said second language are different languages.

5. The method of claim 4, further comprising:
   translating said text data into said second language.

6. The method of claim 1, wherein said text data is received in realtime during said performance.

7. The method of claim 1, wherein said text data is received prior to said performance.

8. The method of claim 1, wherein said performance is selected from the group consisting of a television show, a movie, and a live performance.

9. The method of claim 1, wherein said text data describes actions performed in said audio/video data, and wherein said actions are related to images in said audio/video data viewed by a user.

10. The method of claim 1, wherein said text data comprises reference data identifying a starting time for said performance, and wherein said displaying is initiated at said starting time.

11. The method of claim 1, wherein said portion of video is captured by a camera within said first discrete device.

12. A computing device comprising a processor coupled to a computer-readable memory unit, said computer-readable memory unit comprising instructions that when executed by the processor implement an association method, said association method comprising;
   receiving, by said computing device, text data, said text data associated with audio/video data, wherein said audio/video data is generated during a related performance, wherein said related performance is a live performance attended by a user of said computing device, and wherein said audio/video data and said text data are discrete data;
   receiving, by a translation server of said computing device, a portion of video from said audio/video data during said performance;
   comparing, by said translation server of said computing device, said portion of video to a plurality of pre-stored reference video images on a synchronization server of said computing device;
   determining, by said translation server of said computing device based on results of said comparing, a match between a first reference video image of said plurality of pre-stored reference video images and a first image of said portion of video;

synchronizing, said text data to correspond with said audio/video data during said performance, wherein said synchronizing comprises associating said first reference video image to a corresponding portion of said text data and aligning said corresponding portion of said text data with said first image; and displaying for said user, by a first discrete device and a second discrete device of said computing device, said synchronized text data during said performance, wherein said first discrete device consists of video glasses, wherein said second discrete device consists of a personal digital assistant, and wherein said audio/video data generated during said performance is not displayed by said computing device.

13. The computing device of claim 12, wherein said text data comprises time stamp data that identifies portions of said text data corresponding to potions of said performance, and wherein said method further comprises:

counting time units beginning with a starting time of said performance, wherein said synchronizing further comprises comparing each of said time units to said time stamp data to determine a match.

14. The computing device of claim 12, wherein said method further comprises:

receiving, by the translation server of said computing device, a first portion of audio from said audio/video data during said performance; and generating a first portion of text from said first portion of said audio/video data, wherein said synchronizing further comprises matching said first portion of text to a corresponding portion of said text data and aligning said corresponding portion of text data with said first portion of said audio/video data.

15. The computing device of claim 12, wherein said text data is in a first language, wherein said audio/video data comprises a second language, and wherein said first language and said second language are different languages.

16. The computing device of claim 15, wherein said method further comprises:

translating said text data into said second language.

17. The computing device of claim 12, wherein said text data is received in realtime during said performance.

18. The computing device of claim 12, wherein said text data is received prior to said performance.

19. The computing device of claim 12, wherein said performance is selected from the group consisting of a television show, a movie, and a live performance.

20. The computing device of claim 12, wherein said text data describes actions performed in said audio/video data, and wherein said actions are related to images in said audio/video data viewed by a user.

21. The computing device of claim 12, wherein said text data comprises reference data identifying a starting time for said performance, and wherein said displaying is initiated at said starting time.

22. A computer program product, comprising a computer usable medium comprising a computer readable program code embodied therein, said computer readable program code comprising an algorithm adapted to implement an synchronization method within a computing device, said method comprising:

receiving, by said computing device, text data, said text data associated with audio/video data, wherein said audio/video data is generated during a related performance, wherein said related performance is a live performance attended by a user of said computing device, and wherein said audio/video data and said text data are discrete data;

receiving, by a translation server of said computing device, a portion of video from said audio/video data during said performance;

comparing, by said translation server of said computing device, said portion of video to a plurality of pre-stored reference video images on a synchronization server of said computing device;

determining, by said translation server of said computing device based on results of said comparing, a match between a first reference video image of said plurality of pre-stored reference video images and a first image of said portion of video;

synchronizing, said text data to correspond with said audio/video data during said performance, wherein said synchronizing comprises associating said first reference video image to a corresponding portion of said text data and aligning said corresponding portion of said text data with said first image; and displaying for said user, by a first discrete device and a second discrete device of said computing device, said synchronized text data during said performance, wherein said first discrete device consists of video glasses, wherein said second discrete device consists of a personal digital assistant, and wherein said audio/video data generated during said performance is not displayed by said computing device.

23. The computer program product of claim 22, wherein said text data comprises time stamp data that identifies portions of said text data corresponding to potions of said performance, and wherein said method further comprises:

counting time units beginning with a starting time of said performance, wherein said synchronizing further comprises comparing each of said time units to said time stamp data to determine a match.

24. The computer program product of claim 22, wherein said method further comprises:

receiving, by the translation server of said computing device, a first portion of audio from said audio/video data during said performance; and generating a first portion of text from said first portion of said audio/video data, wherein said synchronizing further comprises matching said first portion of text to a corresponding portion of said text data and aligning said corresponding portion of text data with said first portion of said audio/video data.

25. The computer program product of claim 22, wherein said text data is in a first language, wherein said audio/video data comprises a second language, and wherein said first language and said second language are different languages.

26. The computer program product of claim 25, wherein said method further comprises:

translating said text data into said second language.

27. The computer program product of claim 22, wherein said text data is received in realtime during said performance.

28. The computer program product of claim 22, wherein said text data is received prior to said performance.

29. The computer program product of claim 22, wherein said performance is selected from the group consisting of a television show, a movie, and a live performance.

30. The computer program product of claim 22, wherein said text data describes actions performed in said audio/video data, and wherein said actions are related to images in said audio/video data viewed by a user.

31. The computer program product of claim 22, wherein said text data comprises reference data identifying a starting time for said performance, and wherein said displaying is initiated at said starting time.

32. A process for integrating computing infrastructure, comprising integrating computer-readable code into a computer device, wherein the code in combination with the computer system is capable of performing a method comprising:
   receiving, by said computing device, text data, said text data associated with audio/video data, wherein said audio/video data is generated during a related performance, wherein said related performance is a live performance attended by a user of said computing device, and wherein said audio/video data and said text data are discrete data;
   receiving, by a translation server of said computing device, a portion of video from said audio/video data during said performance;
   comparing, by said translation server of said computing device, said portion of video to a plurality of pre-stored reference video images on a synchronization server of said computing device;
   determining, by said translation server of said computing device based on results of said comparing, a match between a first reference video image of said plurality of pre-stored reference video images and a first image of said portion of video;
   synchronizing, said text data to correspond with said audio/video data during said performance, wherein said synchronizing comprises associating said first reference video image to a corresponding portion of said text data and aligning said corresponding portion of said text data with said first image; and
   displaying for said user, by a first discrete device and a second discrete device of said computing device, said synchronized text data during said performance, wherein said first discrete device consists of video glasses, wherein said second discrete device consists of a personal digital assistant, and wherein said audio/video data generated during said performance is not displayed by said computing device.

33. The process of claim 32 wherein said text data comprises time stamp data that identifies portions of said text data corresponding to potions of said performance, and wherein said method further comprises:
   counting time units beginning with a starting time of said performance, wherein said synchronizing further comprises comparing each of said time units to said time stamp data to determine a match.

34. The process of claim 32, wherein said method further comprises:
   receiving, by the translation server of said computing device, a first portion of audio from said audio/video data during said performance; and
   generating a first portion of text from said first portion of said audio/video data, wherein said synchronizing further comprises matching said first portion of text to a corresponding portion of said text data and aligning said corresponding portion of text data with said first portion of said audio/video data.

35. The process of claim 32, wherein said text data is in a first language, wherein said audio/video data comprises a second language, and wherein said first language and said second language are different languages.

36. The process of claim 35, wherein said method further comprises:
   translating said text data into said second language.

37. The process of claim 32, wherein said text data is received in realtime during said performance.

38. The process of claim 32, wherein said text data is received prior to said performance.

39. The process of claim 32, wherein said text data describes actions performed in said audio/video data, and wherein said actions are related to images in said audio/video data viewed by a user.

\* \* \* \* \*

UNITED STATES PATENT AND TRADEMARK OFFICE
CERTIFICATE OF CORRECTION

| | | |
|---|---|---|
| PATENT NO. | : 7,913,155 B2 | |
| APPLICATION NO. | : 11/355124 | |
| DATED | : March 22, 2011 | |
| INVENTOR(S) | : Sara H. Basson et al. | |

It is certified that error appears in the above-identified patent and that said Letters Patent is hereby corrected as shown below:

Title Page, Item (73) should read:

(73) Assignees: International Business Machines Corporation, Armonk, NY (US); Cape Breton University, Sydney (CA)

Signed and Sealed this
Twenty-ninth Day of November, 2011

David J. Kappos
*Director of the United States Patent and Trademark Office*